No. 892,714. PATENTED JULY 7, 1908.
G. R. DEAN.
POWER TRANSMITTING DEVICE.
APPLICATION FILED JULY 17, 1905.
2 SHEETS—SHEET 1.
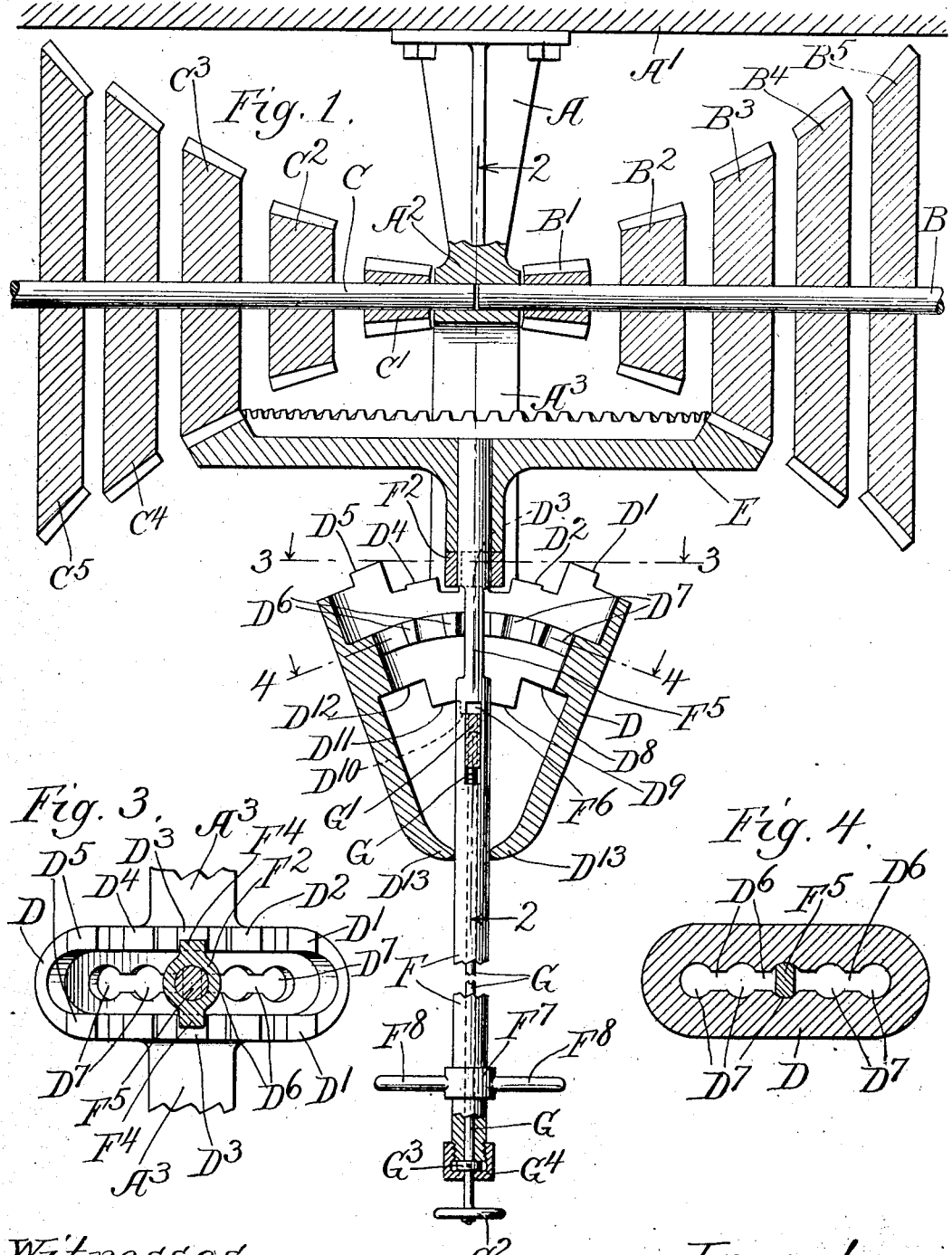
Witnesses.
Edward T. Wray
Homer H. Kraft
Inventor.
George R. Dean,
by Parker & Carter
Attorney's.

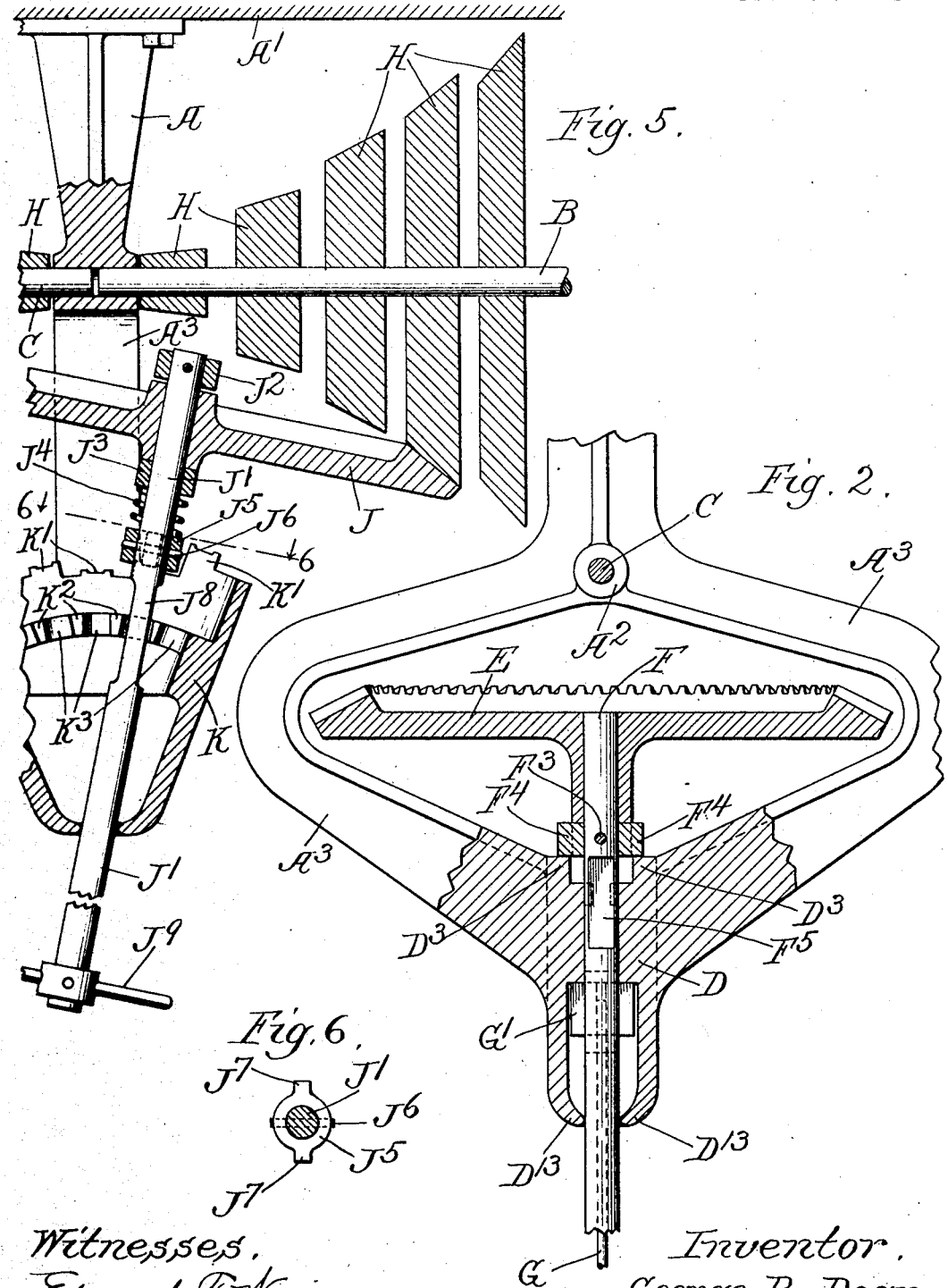

UNITED STATES PATENT OFFICE.

GEORGE R. DEAN, OF CHICAGO, ILLINOIS.

POWER-TRANSMITTING DEVICE.

No. 892,714.

Specification of Letters Patent.

Patented July 7, 1908.

Application filed July 17, 1905. Serial No. 269,912.

*To all whom it may concern:*

Be it known that I, GEORGE R. DEAN, a citizen of the United States, residing at Chicago, in the county of Cook and State of Illinois, have invented a certain new and useful Improvement in Power - Transmitting Devices, of which the following is a specification.

My invention relates to power transmitting apparatus and has for its object to provide new and improved constructions in apparatus of that class.

The invention is illustrated in the accompanying drawings wherein

Figure 1 is a vertical section through one form of apparatus; Fig. 2, a vertical section on line 2—2 of Fig. 1; Fig. 3, a section on line 3—3 of Fig. 1; Fig. 4, a section on line 4—4 of Fig. 1; Fig. 5, a view similar to Fig. 1 of a modified form of apparatus, and Fig. 6, a section on line 6—6 of Fig. 5.

Like letters of reference indicate like parts in all the drawings.

Referring particularly to Figs. 1 to 4 inclusive, A represents the supporting frame of the apparatus which may be suspended from the ceiling $A^1$ in any desired manner. The frame A has the bearing parts $A^2$ for the driving shaft B and the driven shaft C and a hanger $A^3$ terminating in the block D of peculiar construction which forms a bearing for the transmitting wheel E. At intervals along the driving shaft B, and rigidly thereon, are the beveled driving wheels $B^1$, $B^2$, $B^3$, $B^4$, $B^5$. In the construction here shown, these are gear wheels, and there may be any number of them. On the driven shaft C are the correspondingly placed gear wheels $C^1$, $C^2$, $C^3$, $C^4$ and $C^5$. The gear wheels of the two shafts are, therefore, arranged in pairs so as to be engaged by the beveled transmitting gear wheel E, the small gear wheel $B^1$ on the driving shaft thus transmitting motion to the large wheel $C^5$ on the driven shaft, the gear $B^2$ similarly connected with the gear $C^4$, etc. Thus the speed transmitted from B to C may be varied to a very considerable extent. The gears $B^1$, $B^2$, $C^1$, $C^2$, etc. will, of course, have different bevels according to their diameters and the diameter of the transmitting gear E, and this makes it necessary that the gear wheel E should be capable of displacement along the direction of its axis, and also that it should be swung from side to side. To accomplish this result, I have provided the bearing block D. The block is, generally speaking, in the form of a triangular prism. The block is hollow and at its top, that is, at the base of the prism, it has the rim formed with pairs of rectangular projections $D^1$, $D^2$, $D^3$, $D^4$, and $D^5$, there being a pair of such projections for each pair of gear wheels on the shafts B and C, that is, to support the gear wheel E in each of its various positions. In Figs. 1 to 3 inclusive, the gear wheel is shown in its central position and supported on the projections $D^3$. Below the projections $D^1$, $D^2$, etc., the sides of the block D are thickened so as to close the opening through the block except for a central slot. This slot is made up of narrow straight portions $D^6$ $D^6$ arranged alternately with the wider circular portions $D^7$ $D^7$. Below this portion of the block the opening therethrough is again enlarged so as to form pairs of shoulders $D^8$, $D^9$, $D^{10}$, $D^{11}$ and $D^{12}$ parallel with and equidistant from the bearing surfaces of the rectangular projections $D^1$, $D^2$, etc., on the upper rim of the block. The opening through the block D is contracted at the bottom of the block by turning inward the sides, as shown at $D^{13}$ $D^{13}$.

The gear wheel E is mounted so as to be rotated on a shaft F carrying a collar $F^2$ secured thereto by the pin $F^3$ and provided with a pair of side lugs $F^4$ $F^4$. The collar $F^2$ forms a bearing for the hub of the gear wheel E, the lugs $F^4$ $F^4$ resting on the projections $D^1$, $D^2$, etc. on the rim of the block according to the position of the gear wheel. The shaft F is cut out to form the flattened portion $F^5$ for some distance adjacent to the place where it passes through the slot formed by the openings $D^6$, $D^7$ and is made with the slot $F^6$. The slot has a bore to receive the screw threaded stem G which takes into a jam block $G^1$ extending cross-wise through and projecting beyond the slot $F^6$ in the shaft. The jam block $G^1$ is smaller than the slot $F^6$ so that it may have longitudinal movement therein. The stem G terminates in the hand wheel $G^2$ and is kept from longitudinal movement by the collar $G^3$ and the cap piece $G^4$ screwed onto the end of the shaft F. The shaft F has the collar $F^7$ with the spokes $F^8$ $F^8$ for a hand grip.

To illustrate the operation of the apparatus, it will be assumed that the parts are in the positions shown in Figs. 1 to 4 inclusive, that is, with the transmitting gear wheel in engagement with the gears $B^3$, $C^3$. The speeds of the shafts will now, of course, be equal. If it is desired to increase the speed of the driven shaft C, it will be necessary to incline the axis of the gear wheel E toward the right, bringing the wheel into engagement, say, with the gears $B^4$, $C^2$. To do this the hand wheel $G^2$ is turned, lowering the jam block $G^1$. The shaft F is then turned 90° by means of the handles $F^8$ $F^8$, thus of course, rotating the lugs $F^4$ $F^4$ on the collar $F^2$ so that they extend lengthwise of the opening between the pairs of lugs $D^1$, $D^2$, etc., and also turning the flattened portion $F^5$ of the shaft into alinement with the straight slots $D^6$ $D^6$. The gear wheel may now be lowered slightly so as to free its teeth from the teeth of the wheels $B^3$, $C^3$ and it may then be swung to the right on the inturned portion $D^{12}$ $D^{12}$ of the side of the block as a bearing, until the bevel on the wheel E comes into alinement with the wheels $B^4$, $C^2$. The wheel E is then forced upwardly into engagement with these gears, the shaft turned back 90°, the flattened portion $F^5$ turning in one of the circular apertures $D^7$, and the lugs $F^4$ $F^4$ engaging with and resting upon the pair of projections $D^2$ on the rim of the block. The jam block $D^1$ may then be screwed up against the shoulder $D^9$.

In Fig. 5, I have shown a modified form of transmitting apparatus where friction pulleys are substituted for toothed gear wheels. This construction involves some minor changes, although the construction and operation are substantially the same as in the apparatus just described. The driving shaft B is provided with a series of these friction pulleys and the driven shaft C with a like series, these pulleys, indicated generally by the letters H H, being in arrangement and general form similar to the gear wheels except that their perimeters are smooth. Preferably they will be made of some material which will insure a good grip on the bearing surface of the transmission pulley. The transmission pulley J will, of course, also have a beveled, smooth bearing surface and this pulley is mounted so as to rotate upon the shaft $J^1$, having a fixed collar $J^2$ at the end for a stop, and a sliding bearing collar $J^3$ pressed by the spiral spring $J^4$ which abuts against the collar $J^5$ secured to the shaft by the pin $J^6$ and having the side lugs $J^7$ $J^7$. The shaft J is cut out to form the flattened part $J^8$ and is provided with the hand grip $J^9$. This shaft extends through the block K which is similar to the block D and has the projections $K^1$ $K^1$ preferably depressed in the center as shown. The hollow of the block is also bridged similarly to the block D and through this bridge is a slot formed by successive straight portions $K^2$ $K^2$ and the circular portions $K^3$ $K^3$. By pressing upward on the hand grip $J^9$, the lugs $J^7$ are carried out of the depressed part of the projections $K^1$ and the shaft may then be turned so as to bring the lugs into the hollow portion of the block. The shaft may then be swung to the right or left to increase or decrease the speed, pushed in or out, and then turned so that the lugs engage with the proper projections. The tension of the spring $J^4$ will hold the parts in proper position and give the desired intimacy of contact between the bearing surfaces.

I have thus described two forms of construction embodying my invention, but it will be obvious that there might be considerable change in form, construction and arrangement of parts without departing from the spirit of my invention. I, therefore, do not limit myself to the particulars shown, but desire that the drawings be taken as in a sense diagrammatic although illustrating practical, mechanical embodiments of the invention.

I claim:

1. In power transmitting apparatus, the combination of a driving device with a driven device and a transmitting mechanism interposed between the same comprising a bearing block, a shaft extending through such block, and a wheel on the shaft, such block provided with a plurality of bearing parts upon which the shaft may be held in its various positions.

2. In power transmitting apparatus, the combination of a driving device with a driven device and a transmitting mechanism interposed between the same, comprising a bearing block, a shaft extending through such block, a wheel on the shaft, such block provided with a plurality of bearing parts upon which the shaft may be held in its various positions, and means for holding the parts in operative position.

3. In power transmitting apparatus, the combination of a driving device, with a driven device and a transmitting mechanism interposed between the same comprising a bearing block, a shaft extending through such block and adapted to be swung on a part thereof as a fulcrum, and a wheel on the shaft, such block provided with a plurality of bearing parts at different distances from such pivot and upon which the shaft is held in its various positions.

GEORGE R. DEAN.

Witnesses:
HOMER L. KRAFT,
PERCIVAL W. TRUMAN.